AMPLITUDE DISCRIMINATORY SYSTEM

Filed Aug. 24, 1953

INVENTOR.
Hunter C. Goodrich
BY
ATTORNEY 2,890,352
Patented June 9, 1959

2,890,352

AMPLITUDE DISCRIMINATORY SYSTEM

Hunter C. Goodrich, Collingswood, N.J., assignor to Radio Corporation of America, a corporation of Delaware Application August 24, 1953, Serial No. 376,138

10 Claims. (Cl. 307—88.5)

The present invention relates to improvements in amplitude discriminatory amplifying systems and more particularly, although not necessarily exclusively, to signal amplifying systems having an amplifying threshold as well as a limiting threshold for modifying electrical signals communicated by the amplifier.

More generally, the present invention is concerned with improvements in signal amplifying circuits embodying semiconductor amplifying devices such as transistors whereby to afford control over the wave shape delivered by the amplifier for a given input signal such as to define the upper and lower extremities of the delivered signal waveform.

In electrical signal processing systems it is frequently required to separate from a given alternating current input signal a predetermined amplitude range of signal information. This range of information is commonly defined by two operations imposed upon the incoming signal. The first operation is that of permitting transmission of a predetermined clipped portion of an applied waveform, i.e., that portion having at least a prescribed amplitude excursion. This is generally accomplished by means of a threshold or gate circuit action. In this threshold or gate circuit action all signals above a predetermined amplitude are allowed to pass. This operation defines the lower amplitude extremity of the desired separated information. The other operation upon the signal is to limit the resulting clipped information so as to define the maximum amplitude excursion of the separated information.

The present invention provides an improved amplitude discriminatory system embodying semiconductor amplifying devices which, in the case of the transistor, takes advantage of emitter-base current cutoff to establish the lower amplitude extremity of the delivered signal and employs collector circuit saturation to define the higher amplitude limit of the delivered information.

Such a circuit is readily applied to the well known function of separating synchronizing signal information from a received television signal. The lower amplitude extremity of synchronizing signal separation defined by an emitter-base cutoff is made to occur at an amplitude slightly above blanking level in the signal. The collector circuit saturation in the transistor amplifier device is made to occur at a point in the vicinity of the peak amplitude of the arriving synchronizing signal. Blanking information and video signal information are thereby kept from appearing in the separated synchronizing signal by the emitter-base cutoff of the transistor device while signal noise in excess of synchronizing signal peaks is eliminated by collector current saturation.

One of the more serious problems in signal processing circuits having the functions described above and carried out by vacuum tubes in the prior art, has been that as the applied signal varies in amplitude the information represented by the "double-clipped" signal portion changes. In television systems this can cause considerable difficulty since, if, for example, the applied video signal increases in amplitude for any reason, the lower extremity of circuit clipping action may include unwanted blanking information.

One of the novel features of the present invention is that unique advantage is taken of the peculiar characteristics of semiconductor amplifying devices such as transistors, in which collector circuit current saturation is not accompanied by any negative discontinuity in emitter-base current flow. In accordance with this phenomenon, the present invention provides means for self-biasing the amplitude discriminatory amplifier device described above in such a manner as to compensate for changes in incoming signal strength.

It is, therefore, an object of the present invention to provide an improved controllable amplitude discriminatory system embodying semiconductor type amplifying devices.

It is further an object of the present invention to provide a transistor circuit for accomplishing double clipping of a given electrical signal whereby to separate from said signal a predetermined amplitude range of signal intelligence.

It is yet another object of the present invention to provide an improved synchronizing signal processing circuit for television systems wherein synchronizing signal information is effectively clipped from applied video signal and thereafter limited to reduce the effects of extraneous noise signal components extending beyond the amplitude of the synchronizing signal peak.

It is another object of the present invention to provide an improved signal clipping circuit embodying semiconductor amplifying devices which is relatively immune to changes in applied signal level.

Other objects and features of advantage of the present invention, as well as a better understanding of the principles underlying the operation thereof, will be obtained through a reading of the following specification, especially when taken in connection with the accompanying drawing, in which.

Figure 1:
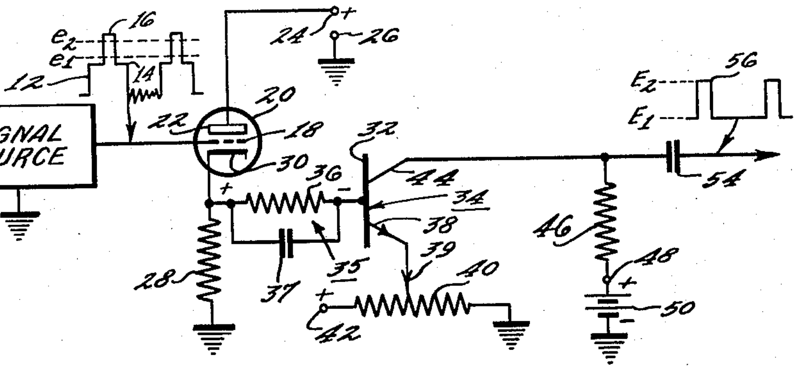
Figure 1 is a combination block and schematic representation of one form of amplitude discriminatory amplifying system embodying a transistor semiconductor amplifying device.

Turning now to Figure 1, there is indicated at 10 a source of alternating current signal voltage such as the video type signal 12 having a blanking level 14 and a synchronizing signal portion 16. The video signal is applied to the control electrode 18 of a cathode follower type amplifier 20. The anode 22 of the tube 20 is connected to a source of power supply potential having a positive terminal at 24 and a grounded negative terminal at 26. A cathode load resistor 28 is connected between the cathode 30 of tube 20 and circuit ground. The signal appearing across the resistor 28 will be, in accordance with well known cathode follower action, a reduced amplitude version of the signal 12.

In accordance with the present invention, and still looking at Figure 1, the upper extremity of cathode resistor 28 is connected with the base 32 of transistor 34 through a time constant network 35 comprising resistor 36 and capacitor 37. The emitter 38 of the transistor 34 is connected to a variable tap 39 on a voltage divider element 40. One extremity of the element 40 is connected with a positive power supply terminal 42 referenced to circuit ground. The other extremity of the element 40 is connected directly with circuit ground. An adjustable bias may, therefore, be established between base 32 and the emitter 38 of the transistor 34.

The collector 44 of the transistor 34 in Figure 1 is connected through a load resistor 46 to terminal 48 of the power source 50 whereby the collector 44 is biased positively with respect to the base 32. Alternating current signals appearing across the load resistor 46 are capacitively coupled via capacitor 54 to a signal utilization circuit.

In discussing one mode of the operation of Figure 1, it will be assumed that the adjustable tap 39 on the bleeder resistor 40 is positioned such that the emitter 38 is rendered positive with respect to the base 32 by a predetermined amount. Since the semi-conductor device has been illustrated as being equivalent to the N–P–N transistor variety, this positive bias of emitter with respect to base will constitute a reverse bias on the transistor emitter-base circuit thereby preventing normal transistor current flow through the emitter-base path. However, when the incoming signal 12 causes the potential of base 32 to rise in a positive direction up to a voltage value corresponding to the position $e_1$ on the waveform 12, the reverse bias established by positioning the tap 39 will be overcome and emitter-base current as well as emitter-collector current instituted. The collector current will continue to rise as the waveform 12, and particularly the sync pulse 16, extends even further in the positive direction to a level at which the voltage drop across the collector load resistor 46 reduces the net collector voltage to a value substantially equal to the base potential. At this point the collector current will no longer rise and the output pulse 56 will be limited at value $E_2$ of the input waveform 12. Thus, by properly adjusting the amplitude of the signal applied to the transistor 34 and by properly adjusting the reverse bias cutoff in the emitter-base path, a double-clipped synchronizing signal 56 may be realized in the collector output circuit. The lower extremity $e_1$ of the output waveform 56 may be made to correspond to a level slightly above the blanking level 14 of the video signal 12 while, as before noted, the upper limit $E_2$ may be made to correspond to a value $e_2$ slightly below tips of a normal sync pulse 16.

It will be observed from what has been explained in connection with the embodiment of Figure 1 that in order for level $E_1$ of the output waveform 56 to maintain its relation to relative level $e_1$ of the input waveform 12, some compensation must be provided for inadvertent changes in amplitude of signal 12 as applied to the circuit. This is accomplished in the present invention through the utilization of the time constant network 36—37 connected between the cathode load resistor 28 and the base 32 of transistor 34 taken in combination with the above described collector saturation effects. Through the provision of this network the present invention takes novel advantage of the fact that unlike vacuum tube phenomenon, the base-emitter current in a transistor will continue to rise even through collector saturation has occurred. Moreover tests will show that in the common transistor the rate of rise of this input current tends to become faster (for a given increase in applied potential) at the time collector saturation occurs. This is attributable to the sharp decrease in the input resistance of the transistor at the time when $\alpha_{cb}$ (the current gain from base to collector) drops to below unity which in turn occurs when collector saturation takes place. In other words, the reverse bias on the transistor is, in accordance with the present invention, controlled as a function of the amplitude of the applied signal. The more accurately this reverse bias is controlled, the greater will be the accuracy with which clipping of the synchronizing signal is carried out. This is one reason why, in accordance with the present invention, means are provided for establishing collector saturation in response to the peaks of the synchronizing pulses. Not only does this saturation limit and suppress unwanted noise excursions extending above the peaks of the synchronizing pulses, but it also provides a desirable decrease in the input resistance of the transistor at the point when collector saturation occurs such that the reverse bias developing ability of the series time-constant circuit is, in effect, given an electrical gain, the magnitude of which depends on the magnitude of the above described change in the transistor input resistance.

Tests further show and existing transistor theory supports the fact that, in the common transistor, this sharp decrease in transistor input resistance ($Ri$) always occurs exactly at the point when collector saturation is produced. This is true substantially independently of the values of circuit parameters associated with the transistor and/or the actual gain characteristics of the transistor. The following well-known expression makes this clear:

$$Ri = R_{bb'} + (\alpha_{cb} \times R_e)$$

where $Ri$ is the effective input resistance to the transistor looking between the emitter and base, $R_{bb'}$ is the base resistance of the transistor, $\alpha_{cb}$ is the current gain of the transistor from base to collector, and $R_e$ is the effective resistance of the emitter junction. At collector saturation the term $\alpha_{cb}$ becomes well under unity which reduces the input resistance $Ri$ to a value little more than $R_{bb'}$ (see Proceedings of the IRE for July 1951, pages 753–767). Furthermore due to so-called conductivity modulation effects in the common transistor, the value of $R_{bb'}$ may drop as much as three or four to one at collector saturation. Thus, if collector saturation is permitted to take place in the manner provided for in the present invention, the input resistance of the transistor will change as much as twenty to one as a consequence of collector saturation.

Thus, the average current through resistor 36 will always be a function of the peak value of the incoming waveform 12, regardless of where the signal is clipped. Should, therefore, the amplitude of the signal 12 increase, the current passing through the base-emitter path will increase so that the voltage across capacitor 37 will become greater with the polarity indicated. It will be noticed that this polarity is in the direction to increase the reverse bias in the emitter-base path, thereby requiring a greater excursion of the applied waveform in a positive direction to establish conduction in the transistor 34 thereby maintaining a conduction level of $e_1$ of the incoming signal. A drop in the amplitude of the applied signal 12 will produce a corresponding correction of the reverse bias on the transistor 34 so as to properly adjust the clipping level $e_1$.

It will be further appreciated in connection with the embodiment of the present invention shown in Figure 1, that the novel compensating effect peculiar to transistor action provided by the time constant circuit 35 is useful whether or not a lower clipping threshold $e_1$ is employed. That is to say, if no fixed reverse bias is employed in the emitter-base circuit, the time constant network 35 will have a tendency to stabilize the position at which collector saturation occurs in defining the upper limit $E_2$ of the output waveform 56 which in turn corresponds to the level $e_2$ of input waveform 16. It is, moreover, evident that the value of the time constant network 35 may be such as to permit the emitter-base circuit of the transistor 34 to be initially biased in the forward direction with the voltage developed across the time constant network acting to overcome the initial forward bias sufficiently to produce clipping at level $e_1$.

Figures 2, 3:
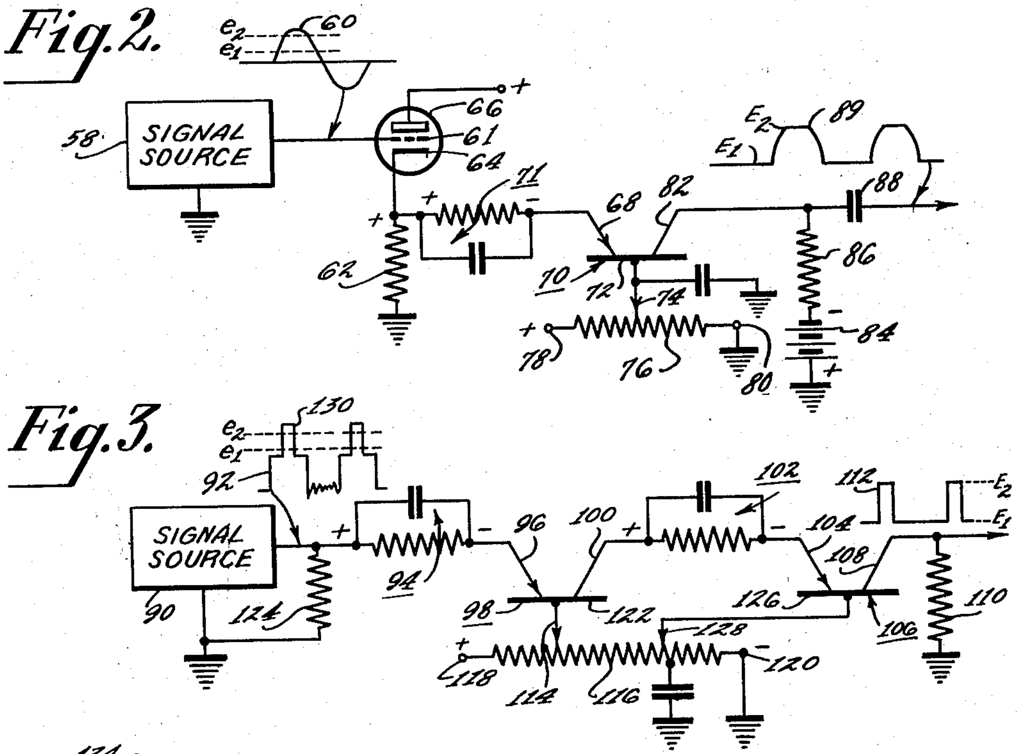
Figure 2 is a combination block and schematic representation of another form of amplitude discriminatory amplifying system embodying a transistor semiconductor amplifying device.
Figure 3 is still another form of amplitude discriminatory amplifying system embodying a transistor semiconductor amplifying device.

Another embodiment of the present invention involving a semiconductor amplifier, for example of the P–N–P transistor type, is shown in Figure 2. Here a signal source 58 is shown applying a sinusoidal waveform 60 to the input electrode 61 of a cathode follower type amplifier. Sinusoidal input voltage 60 will appear in reduced amplitude form, as explained in connection with Figure 1, across the cathode resistor 62. The cathode 64 of the cathode follower amplifier tube 66 is connected to the emitter 68 of the transistor 70 through the time constant network 71. The base 72 of the transistor 70 is connected to variable tap 74 along the bleeder resistor 76. As in Figure 1, the extremities of bleeder resistor 76 are connected across a power supply having a positive terminal at 78 and a negative terminal connected with circuit ground at 80. The collector 82 is in turn connected with a source of negative biasing potential 84 through a collector load resistor 86. A coupling capacitor 88 is provided for communicating the resulting output signal to a signal utilizing device of some form (not shown).

In one mode of operation in Figure 2, the tap 74 of the bleeder resistor 76 is adjusted so that the base 72 is rendered positive with respect to the emitter 68. This imposes on the emitter 68 a reverse bias so as to prohibit transistor action in the transistor 70. The collector 82 being connected with a reverse bias source will then have no appreciable current flowing through it. However, as the incoming sinusoidal signal 60 reaches a value corresponding to $e_1$, the emitter 68 will be rendered positive with respect to the base 72. This will inaugurate collector-emitter current flow through the transistor which occurrence corresponds to $E_1$ of output waveform 89. The sinusoidal waveform 60 will continue to rise in a positive direction until the voltage drop across resistor 86 is such that the collector 82 is no longer negative with respect to the base 72. This point may correspond to level $e_2$ of waveform 60 and produce the saturated clipped effect $E_2$ of output waveform 89. The output waveform 89, substantially square in nature, therefore, corresponds to but a portion of the amplitude range ($e_1$ to $e_2$) of the applied signal 60.

It will be noted in connection with Figure 2 that should the amplitude of the applied signal 60 increase, there would be a tendency for the clipping level $e_1$ to become effective too early upon the sine wave. As previously shown in Figure 1, and in accordance with the present invention, the time constant circuit 71 will develop a correction potential due to increased average emitter-base current, even though collector saturation has occurred. Thus, the potential across the time constant network 71 will increase in the polarity indicated so as to re-establish the clipping level $e_1$ at a position along the sine wave corresponding to its original relative position. Again, the setting of tap 74 on resistor 76 may be such as to establish an initial forward emitter base bias which is sufficiently overcome by the time constant circuit 71 reverse bias to effect the above-described operation in accordance with the present invention.

The embodiment of the invention shown in Figure 3 involves a source of video signal 90 one output terminal of which is connected with circuit ground. The video signal 92 appearing at the other output terminal is coupled via the time constant network 94 to the emitter 96 of a semiconductor amplifying device 98. The amplifying device 98 may be of the transistor variety and equivalent to a P–N–P junction transistor. The collector 100 of transistor 98 is in turn direct current coupled through a time constant circuit 102 to the emitter 104 of another semiconductor amplifier device 106. The amplifier device 106 has also been shown as equivalent to a P–N–P type transistor. The collector 108 of transistor 106 is connected through resistor 110 to circuit ground. Double-clipped output signal 112 appears across the resistor 110 as described hereinafter.

In the arrangement of Figure 3 the base of transistor 98 is connected to a point 114 along a voltage divider resistance means 116. Resistance means 116 has its extremities connected across a source of power having a positive terminal at 118 and a negative terminal at 120. The base 122 of transistor 98 will be rendered positive with respect to circuit ground. Since the emitter 96 of transistor 98 is connected with ground potential through resistor 124, it is apparent that the transistor 98 will have a net reverse bias between the emitter and base. The base 126 of transistor 106 is in turn connected to a point 128 along the voltage dividing means 116 so that the base 126 is rendered positive with respect to circuit ground yet negative with respect to the base 122 of transistor 98.

In the operation of Figure 3, the reverse bias on transistor 98 through the adjustment of point 114 connected with the base 122, is adjusted to correspond to a point below the level $e_1$ of the video signal 92. The synchronizing signal portion 130 of the video signal, however, is caused to swing the potential of the emitter 96 positive with respect to the base 122. This will cause conduction through the time constant circuit 94 with the resulting development of a charge thereacross with the polarity indicated. The value of potential across the time constant circuit 94 and the reverse bias on the emitter-base circuit of the transistor 98 will allow emitter-base conduction at a level corresponding to $e_1$ shown in reference to the video signal 92. Since the base 126 of transistor 106 is negative with respect to the collector 100 of transistor 98, and since the collector 108 is negative with respect to the base 126 of transistor 106, transistor 106 will be seen to operate as a direct current coupled amplifier. However, if the emitter-collector current of the transistor 98 increases, the emitter-collector current of transistor 106 must also increase. This will develop a charge across the time constant network 102 with the polarity indicated. The value of the potential developed across the time constant circuit 102 will be a function of the signal amplitude 92. As the signal 92 swings the collector 108 in a sufficiently positive direction, due to increased emitter-collector current flow, a condition of collector saturation will occur, as previously described, when the collector 108 is at substantially the same potential as the base 126. This saturation effect will, of course, establish the upper limit $E_2$ of the output waveform 112, the lower limit $E_1$ thereof corresponding to the clipping level $e_1$ of waveform 92. The upper limit $E_2$ also corresponds to the level $e_2$ shown in reference to waveform 92. Should the amplitude of the signal waveform 92 increase the potential developed across the time constant circuit 102 will increase, thereby tending to increase the reverse bias on transistor 106 causing collector saturation to occur later.

It will thus be seen that due to the unique conduction characteristics of the emitter-base path in a transistor device and the novel circuitry of the present invention which takes advantage of these characteristics, the signal processing action provided by the arrangement of Figure 3 will to an extent be self-adjusting as to changes in the amplitude of applied signal.

Figure 4:
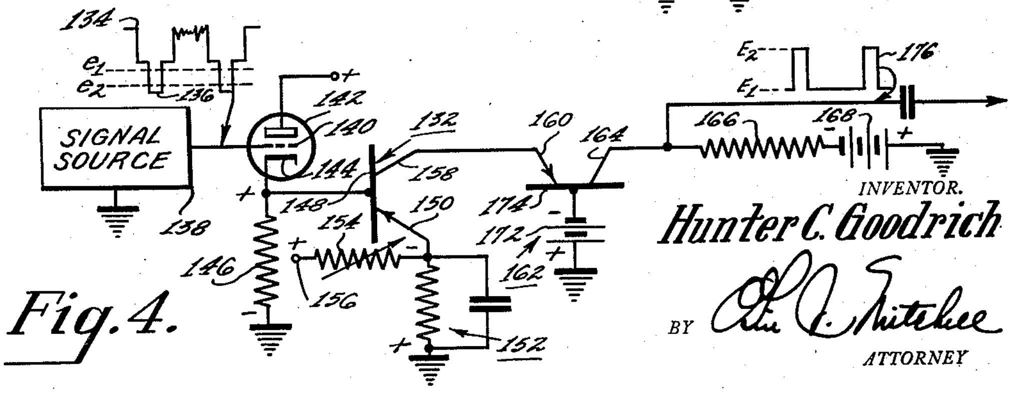
Figure 4 represents yet another form of amplitude discriminatory amplifying system embodying a transistor semi-conductor amplifying device.

The embodiment of the present invention shown in Figure 4 is substantially the same type of arrangement as that shown in Figure 1, with the exception that a P–N–P transistor type semiconductor amplifier 132 is employed rather than an N–P–N type. The signal to be processed is illustrated, by way of example, as being a video signal 134 having its synchronizing signal portion 136 extending in a negative going direction. The signal 134 is coupled from its source 138 to the control electrode 140 of the cathode follower stage 142. The cathode 144 of the cathode follower stage is connected with circuit ground through a cathode load resistor 146. The cathode 144 is in turn direct current connected to the base 148 of the transistor 132. The emitter 150 is connected with circuit ground through a time constant circuit 152. A variable resistor or rheostat 154 is connected from a source of positive power supply potential having a terminal at 156 to the emitter 150. The collector 158 of the transistor 132 is direct current connected to the emitter 160 of the transistor 162. The collector 164 of the transistor 162 is connected through collector load resistor 166 to a source of negative bias potential 168.

In the operation of the arrangement of Figure 4, the rheostat 154 is adjusted so that the net bias between the emitter 150 and base 148 is in the reverse direction. The value of this bias is chosen to correspond to a level below the level $e_1$ on the waveform 134. As the waveform 134 extends beyond this bias level in a negative direction the base 148 will swing negatively with respect to the emitter 150, thereby overcoming the reverse bias and causing conduction in the transistor 132. Should the signal level applied to the base 148 increase in amplitude, voltage developed across the time constant circuit 152 will increase with the polarity indicated, thereby tending to bias the emitter-base circuit more in the reverse direction. This will prolong or extend the time along the waveform 134 at which conduction is caused to occur in the transistor 132 in a direction tending to compensate for the increase in signal amplitude and maintain signal clipping very close to the $e_1$ level.

The transistor amplifier 162 is direct current coupled with the transistor 132 as described above. The bias source 172 connected between the base 174 and circuit ground provides a source of current reference negative potential suitable for biasing the emitter-base circuit of the transistor 162 in a forward direction at the same time providing the required negative collector voltage for the transistor 132. As the signal voltage 134 extends in the negative direction at the base of the transistor 132, the current through the transistor 132 emitter-collector circuit will increase, this will in turn increase the current through the collector load resistor 166 until the collector potential is equal to the potential of the base 174. At this point, collector saturation as described hereinabove, will occur and a limiting level $E_2$ on the output signal 176 will be realized. The level $E_1$ on the signal 176 corresponds to the clipping threshold $e_1$ provided by the transistor stage 132.

It will be appreciated from an understanding of the above invention that the time constant circuits employed by the present invention to achieve the self-adjusting action described may be tailored in time constant value to meet different requirements. The more nearly the time constant value of the self-adjusting time constant circuits approach the recurrence period of the incoming signal, the more rapid will the circuit adjust itself to changes in the incoming signal amplitude. However, in general, the longer the time constant value of the self-adjusting time constant circuits, the more inherent noise immunity the circuit will display. These considerations are well known in the electronic art.

What is claimed is:

1. In a signal processing circuit, the combination of: a circuit ground; a source of signal voltage referenced to circuit ground; a first semiconductor amplifying device having electrodes corresponding to an emitter, base and collector; a source of power supply potential referenced to circuit ground; a resistance means connected from said potential source to circuit ground, said resistance means having a first and second tap thereon, said second tap being at a potential negative with respect to said first tap; direct current connection from said base to said first tap; a parallel resistance capacitance time constant circuit serially connected between said signal source and said emitter; a second semiconductor amplifying device having electrodes corresponding to a base, emitter and collector; a direct current connection from said second amplifying device base to said second resistance means tap; parallel resistance capacitance time constant means connected from said first amplifying device collector to said second amplifying device emitter; a resistor connected from said second amplifying device collector to circuit ground; and a capacitor connected from a point along said resistance means to circuit ground.

2. In a synchronizing signal clipping circuit for television use, the combination of: circuit ground; a source of video signal having blanking and a recurring synchronizing signal portion extending in a predetermined polarity direction with respect to circuit ground; a semiconductor amplifying device having electrodes corresponding to a base, emitter and collector; a parallel resistance capacitance time constant circuit connected between said base and emitter, the time constant value of said time constant circuit being greater than the recurrence period of said synchronizing portion; signal coupling means connected with said signal source and the emitter-base circuit defined in part by said time constant circuit; bias means connected in said emitter-base circuit of a value which when combined with time constant circuit terminal voltage prevents emitter-base conduction for signal excursions below the blanking level of applied video signal; a collector circuit reverse bias source having one terminal thereof connected with said base; and a resistor connected from said collector to said collector reverse bias source, the value of said resistor being sufficiently high to allow collector current saturation at video signal levels below peak excursions of said synchronizing signal portion.

3. In a synchronizing signal separating circuit for television type signals having a synchronizing component made up of periodically recurrent pulses representing amplitude and timing datum information interposed between which pulses is presented random intelligence information having peak signal excursions which are substantially limited to levels below the base portions of said synchronizing pulses, the overall peak-to-peak amplitude of said television type signals being subject to unwanted variations, the combination of: a semiconductor amplifier device of the common transistor variety having electrodes corresponding to a base, emitter, and collector, said device being characterized in that when provided with an external forwardly biased input circuit connected between said emitter and base, and an external reversed biased output circuit containing substantial resistance providing a galvanic connection between said collector and said base current values in excess of a predetermined maximum will produce collector saturation upon the occurrence of which said collector assumes a limiting maximum potential substantially unchanged by further increases in emitter current, said device being further characterized by a relatively low input resistance between said emitter and base which sharply decreases to an even lower value upon said condition of collector saturation; a first resistance means galvanically connected between said emitter and said base to comprise an input circuit; a second resistance means connected between said collector and base to comprise an output circuit; a potential source connected in reverse biasing relation between said collector and emitter and in series with said second resistor; a relatively low impedance source of signals of the type described and of an amplitude the level and polarity of which is such that when capacitively coupled to said input circuit said synchronizing pulses produce collector saturation in response to the minimum expected peak-to-peak amplitude of said signals; means including the serial connection of a capacitor between said signal source and said input circuit applying said signals in the polarity described such that said capacitor is periodically charged in accordance with said synchronizing pulse at a first given rate when emitter current values are below said predetermined maximum and at a second higher given rate when emitter current values are above said predetermined maximum, the value of said capacitor being such that the charge thereby produced thereon establishes a net reverse bias in said input circuit; resistance means included in said input circuit connected in discharging relationship to said capacitor to form a time constant circuit whose value permits discharge of said capacitor between successive synchronizing pulses to an extent providing for but limiting conduction in said emitter base path to those periods defined by each of said synchronizing pulses, whereby to produce across said second resistor synchronizing pulse representations separated from said random intelligence signals and of substantially constant amplitude over wide limits of said unwanted variations in the peak-to-peak value of said signals.

4. In an electrical signal processing circuit for an electrical signal having a pulse component made up of periodically recurrent pulses representing timing datum information interposed between which pulses is presented signal information having peak signal excursions which are substantially limited to levels below a predetermined maximum, the overall peak-to-peak amplitude of said signal being subject to undesired variations, the combination of: a semiconductor amplifier device having electrodes corresponding to a base, emitter, and collector, said device being characterized in that when provided with an external forwardly biased input circuit connected between said emitter and base, and an external reversed biased output circuit containing substantial resistance providing a galvanic connection between said collector and said base, base current values in excess of a predetermined maximum will produce collector saturation upon the occurrence of which said collector assumes a limiting maximum potential substantially unchanged by further increases in emitter current, said device being further characterized by a relatively low input resistance between said emitter and base which sharply decreases to an even lower value upon said condition of collector saturation; a first resistance means galvanically connected between said emitter and said base to comprise an input circuit; a second resistance means connected between said collector and base to comprise an output circuit; a potential source connected in reverse biasing relation between said collector and emitter and in series with said second resistor; a relatively low impedance source of signals of the type described and of an amplitude the level and polarity of which is such that when capacitively coupled to said input circuit said pulses produce collector saturation in response to the minimum expected peak-to-peak amplitude of said signals; means including the serial connection of a capacitor between said signal source and said input circuit applying said signals in the polarity described such that said capacitor is periodically charged in accordance with said pulses at a first given rate when emitter current values are below said predetermined maximum and at a second higher given rate when emitter current values are above said predetermined maximum, the value of said capacitor being such that the charge thereby produced thereon establishes a net reverse bias in said input circuit; resistance means included in said input circuit connected in discharging relationship to said capacitor to form a time constant circuit whose value permits discharge of said capacitor between successive pulses to an extent providing for but limiting conduction in said emitter base path to those periods defined by each of said pulses and for amplitude levels thereof in excess of said predetermined maximum whereby to produce across said second resistor pulse representations separated from said random intelligence signals and of substantially constant amplitude over wide limits of said unwanted variations in the peak-to-peak value of said signals.

5. In a synchronizing signal clipping circuit for television use, the combination of: circuit ground; means providing a source of video signals having blanking and a recurring synchronizing signal portion extending in a predetermined polarity direction with respect to circuit ground; a semiconductor amplifying device having electrodes corresponding to a base, emitter and collector; means including a resistance-capacitance time constant circuit connected between said base and emitter having a time constant value greater than the recurrence period of said synchronizing portion and responsive to signals applied thereto to provide a bias voltage which prevents emitter-collector current conduction for signal excursions below the blanking level; means for applying signals from said source to said emitter-base circuit in a polarity direction that said synchronizing signal portions tend to cause base-emitter current; a collector circuit reverse bias source; a resistor connected in series with said collector reverse bias source between said collector and emitter, the value of said resistor being sufficiently high to allow collector current saturation at video signal levels below peak excursions of said synchronizing signal portion.

6. A double clipping circuit comprising the combination of: circuit ground; means providing a source of signals having recurrent pulse portions extending in a predetermined polarity direction with respect to circuit ground; a semiconductor amplifying device having electrodes corresponding to a base, emitter and collector; means including a resistance-capacitance time constant circuit connected between said base and emitter having a time constant value of said time constant circuit being greater than the recurrence period of said recurrent pulse portion and responsive to signals applied thereto to provide a bias voltage which prevents emitter-collector conduction for signal excursions below a level established by said bias voltage; means for applying signals from said source to said emitter-base circuit in a polarity direction that said pulse portions tend to cause emitter-base current; a collector circuit reverse bias source; a resistor connected in series with said collector reverse bias source between said collector and emitter, the value of said resistor being sufficiently high to allow collector current saturation at signal levels below peak amplitude excursions of said pulse portions.

7. An amplitude discriminatory circuit comprising in combination, a semiconductor device having electrodes corresponding to a base, emitter and collector, means for applying a signal having recurrent pulse components between said base and emitter electrodes in a polarity direction that the peak excursions of the pulse components tend to cause current flow between said base and emitter electrodes, said means including a resistance-capacitance biasing network for developing a reverse cut-off bias in the base-emitter path in response to said pulse components to maintain the emitter-collector current path cut-off for signals of an amplitude less than that of said recurrent pulse components, the time constant value of said resistance-capacitance network being greater than the recurrence period of said recurrent pulse components, and output circuit means connected in series with said collector and including operating potential supply means and an element of sufficient impedance to cause collector current saturation for the peak amplitude excursions of said recurrent pulse components.

8. An amplitude discriminatory circuit as defined in claim 7 wherein said resistance-capacitance biasing network is connected between said base and a drive source for supplying said signals.

9. An amplitude discriminatory circuit as defined in claim 7 wherein said resistance-capacitance network is connected between said emitter and a driving source for supplying said signals.

10. An amplitude discriminatory circuit comprising in combination, a semiconductor device having electrodes corresponding to a base, emitter and collector, means for applying a signal having recurrent pulse components between said base and emitter electrodes in a polarity direction that the peak excursions of the pulse components tend to cause current to flow between said base and emitter electrodes, said means including a resistance-capacitance biasing network for developing a reverse cut-off bias in the base-emitter path in response to said pulse components to maintain the emitter-collector current path cut-off for signals of an amplitude less than that of said recurrent pulse components, the time constant value of said resistance-capacitance network being greater than the recurrent period of said recurrent pulse components, a second semiconductor device having electrodes corresponding to a base, emitter and collector, a connection from the collector of said first device to the emitter of said second device, and output circuit means connected in series with the collector of said second device including operating potential supply means and an element of sufficient impedance to cause collector current saturation for the peak amplitude excursions of said recurrent pulse components.

References Cited in the file of this patent

UNITED STATES PATENTS

| | | |
|---|---|---|
| 2,235,550 | Fyler | Mar. 18, 1941 |
| 2,259,538 | Wheeler | Oct. 21, 1941 |
| 2,295,323 | Armstrong | Sept. 8, 1942 |
| 2,398,596 | Price | Apr. 16, 1946 |
| 2,482,803 | Smith et al. | Sept. 27, 1949 |
| 2,583,345 | Schade | Jan. 22, 1952 |
| 2,622,213 | Harris | Dec. 16, 1952 |
| 2,625,603 | Gruen et al. | Jan. 13, 1953 |
| 2,652,460 | Wallace | Sept. 15, 1953 |
| 2,666,817 | Raisbeck et al. | Jan. 19, 1954 |
| 2,676,271 | Baldwin | Apr. 20, 1954 |
| 2,680,160 | Yaeger | June 1, 1954 |
| 2,747,111 | Koch | May 22, 1956 |
| 2,752,422 | Alexander | June 26, 1956 |

FOREIGN PATENTS

| | | |
|---|---|---|
| 461,118 | Italy | Jan. 15, 1951 |